United States Patent [19]

Jenkins

[11] Patent Number: 4,934,192
[45] Date of Patent: Jun. 19, 1990

[54] TURBINE BLADE VIBRATION DETECTION SYSTEM

[75] Inventor: Maurice A. Jenkins, Casselberry, Fla.

[73] Assignee: Westinghouse Electric Corp., Pittsburgh, Pa.

[21] Appl. No.: 217,591

[22] Filed: Jul. 11, 1988

[51] Int. Cl.$^5$ ............................................. G01H 11/00
[52] U.S. Cl. ...................................................... 73/660
[58] Field of Search ........................ 73/660, 661, 649; 324/207, 208, 243; 415/118

[56] References Cited

U.S. PATENT DOCUMENTS

| | | | |
|---|---|---|---|
| 3,208,269 | 9/1965 | Eccles et al. | 324/208 |
| 3,307,164 | 2/1967 | Zimmer | 324/208 |
| 3,467,358 | 9/1969 | Zablotsky et al. | 73/660 |
| 4,153,388 | 5/1979 | Naegeli et al. | 415/61 |
| 4,326,804 | 4/1982 | Mossey | 356/375 |
| 4,384,819 | 5/1983 | Baker | 415/14 |
| 4,413,519 | 11/1983 | Bannister et al. | 73/660 |
| 4,422,333 | 12/1983 | Leon | 73/660 |
| 4,507,658 | 3/1985 | Keating | 343/12 R |
| 4,573,358 | 3/1986 | Luongo | 73/660 |
| 4,593,566 | 6/1986 | Ellis | 73/660 |
| 4,644,270 | 2/1987 | Oates et al. | 324/207 |
| 4,737,709 | 4/1988 | Loftus | 415/118 |

Primary Examiner—Hezron E. Williams
Assistant Examiner—Louis M. Arana

[57] ABSTRACT

A system for monitoring the vibration of a plurality of turbine blades configured in a row includes first and second sensors for producing first and second input signals, respectively, when a turbine blade is sensed. The first and second sensors are mounted to substantially simultaneously sense the same turbine blade. Circuitry compares the first and second input signals to detect axial displacement. An output device is responsive to the detected displacement.

11 Claims, 4 Drawing Sheets

TURBINE BLADE VIBRATION DETECTION SYSTEM

BACKGROUND OF THE INVENTION

1. Field of the Invention

The present invention is directed generally to monitoring operating parameters in a steam turbine and, more specifically, to the monitoring of unshrouded turbine blade vibration.

2. Description of the Prior Art

Turbine blades, because of their complex design, can suffer from vibration at frequencies which correspond to natural frequencies of the blade called modes. Each mode is associated with a different type of vibration such as along the rotational axis of the turbine, perpendicular to the rotational axis of the turbine, etc. To prevent excessive vibration of the blade about its normal position, normal design practice dictates that the blades be constructed such that modes are located between harmonics of the operating frequency of the steam turbine. However, manufacturing tolerances, changes in blade attachment to the rotor, changes in blade geometry due to erosion and changes in the operating frequency of the turbine, among other factors, cause mode frequencies to approach harmonics of the operating frequency. The approach of the modes to the harmonics of the operating frequency may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery. Thus, methods and apparatus for detecting such vibrations are necessary to prevent such damage.

An apparatus for detecting the vibration of the blades of a turboengine is disclosed in U.S. Pat. No. 3,467,358 issued Sept. 16, 1969 to Zablotsky et al. In that patent, a pair of non-contact electric pulse transmitters are mounted on stationary parts of the engine near its rotor blades and are displaced in the plane of rotation relative to each other by an amplitude of vibration which indicates either a preset or an excessive value which is to be detected. The transmitters may be positioned on opposite ends of the blade, as shown in FIG. 3 of the Zablotsky Patent. In such an orientation, the angle of displacement between the two transmitters is derived by dividing an indicated amplitude of torsional vibration by the external radius of the rotor. The pulses produced by the transmitters are processed through appropriate circuitry to produce output signals indicative of the detected vibration.

Numerous other systems exist for measuring the vibration of unshrouded turbine blades. However, the need exists for an apparatus and method which are simple to implement and reliable, yet which provide the necessary accuracy to detect dangerous levels of vibration before the turbo machinery is damaged.

SUMMARY OF THE INVENTION

The present invention is directed to a system for monitoring the vibration of a plurality of turbine blades configured in a row. A first sensor produces a first input signal when a turbine blade is sensed. A second sensor produces a second input signal when a turbine blade is sensed. The first and second sensors are mounted so that they substantially simultaneously sense the same turbine blade. A circuit is provided for comparing the first and second input signals to detect axial displacement of the turbine blade. An output device is responsive to the detected axial displacement.

According to one embodiment of the present invention the first and second sensors produce analogue input signals which each have peak values coinciding with the presence of a turbine blade at the first and second sensors. The sensors are mounted such that the peak value of the first signal equals the peak value of the second signal in the absence of axial displacement. The difference in magnitude between the peak values is an indication of the degree of axial displacement.

According to another embodiment of the present invention a sensor is provided for sensing the speed of rotation of the turbine blades. Based on that measured speed, the time at which each peak value of the first and second input signals will occur is calculated. Circuitry is provided for comparing the calculated time to the actual time when the peak values of the first and second input signals occurs. That time differential is a measure of the tangential displacement, i.e. blade displacement within the plane of rotation of the turbine blades.

According to another embodiment of the present invention the first and second sensors are responsive to a blade projection formed on the end of each turbine blade. One turbine blade may be left without a projection, or may be provided with a different type of projection, to provide a reference blade.

The present invention also includes a method of monitoring the vibration of a plurality of turbine blades configured in a row. The method includes the step of producing first and second input signals when a turbine blade is sensed. The first and second input signals are substantially simultaneously produced in response to sensing the same turbine blade. In the absence of axial displacement, the first and second signals have a known predetermined relationship. The first and second input signals are compared and axial displacement of the turbine blade is detected based on deviations from the known predetermined relationship. An indication of the degree of displacement may be provided.

The apparatus and method of the present invention provide a simple yet reliable method of detecting turbine blade vibration. The apparatus and method are easy to implement, economical, and provide the accuracy needed to detect undesirable vibration before the vibration becomes critical. These and other advantages and benefits of the present invention will become apparent from a description of a preferred embodiment herein below.

BRIEF DESCRIPTION OF THE DRAWINGS

In order that the present invention may be easily understood and readily practiced, preferred embodiments will now be described, by way of example only, in conjunction with the figures wherein.

DESCRIPTION OF THE PREFERRED EMBODIMENT

Figure 1:
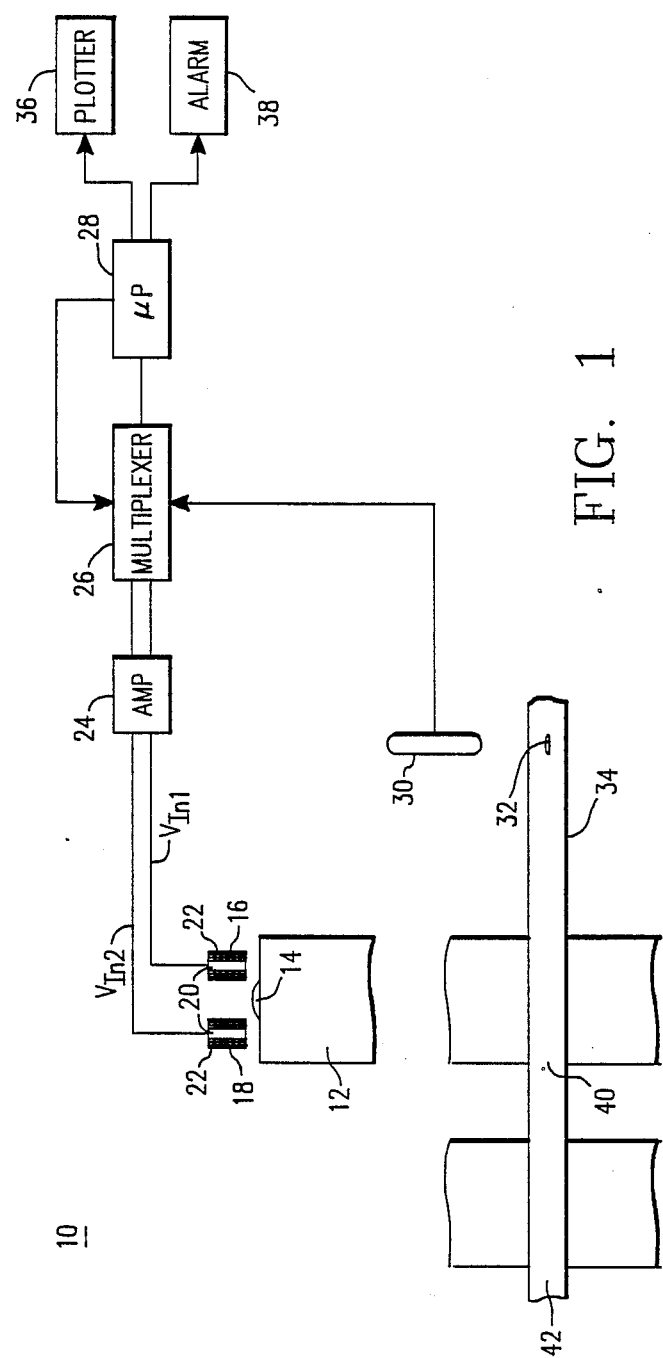
FIG. 1 is a block diagram of a turbine blade vibration detection system constructed according to the teachings of the present invention.

A turbine blade vibration detection system 10 constructed according to the teachings of the present invention is illustrated in FIG. 1. Illustrated in FIG. 1 is a portion of a turbine blade 12 carried by a rotor 34. The turbine blade 12 may, for example, be one of the blades within the last row 40 or next to last row 42 of turbine blades of a steam generator. Each of such rows may include as many as one hundred and twenty turbine blades. The last two rows of turbine blades in some types of steam generators are unshrouded as is known. In addition, the rotor 34 carries other rows of turbine blades (not shown) as is known.

Each of the turbine blades, except a reference blade discussed in, greater detail below, carries a projection 14. The blade projections 14 are of a design which will not introduce stress concentrations in the blades.

The system 10 is comprised of a pair of sensors 16 and 18. Each of the sensors is of a type which has a permanent magnet 20 surrounded by a pick-up coil 22. The projection 14 on the top of each turbine blade serves to deflect the flux patterns produced by the permanent magnets 20. The pick-up coils 22 are responsive to the deflected flux patterns to produce a first input signal $V_{In1}$ produced by the first sensor 16 and a second input signal $V_{In2}$ produced by the second sensor 18.

The input signals are amplified by an amplifier 24 and input to a multiplexer 26. The multiplexer 26 is under the control of a microprocessor 28 in a known manner. The microprocessor 28 operates the multiplexer such that the input signals $V_{In1}$ and $V_{In2}$ are serially input to an analogue to digital convertor (not shown) before being input to the microprocessor 28.

The system 10 also includes a speed sensor 30 which produces a signal input to the microprocessor 28. The speed sensor 30 may be a known type of sensor which is responsive to an indicia 32 formed in the rotor 34. The sensor 30 responds to the indicia 32 to provide one signal per revolution of the rotor 34 from which the microprocessor 28 can calculate the linear speed of the projections 14 carried by the turbine blades.

Figures 2, 3, 4:
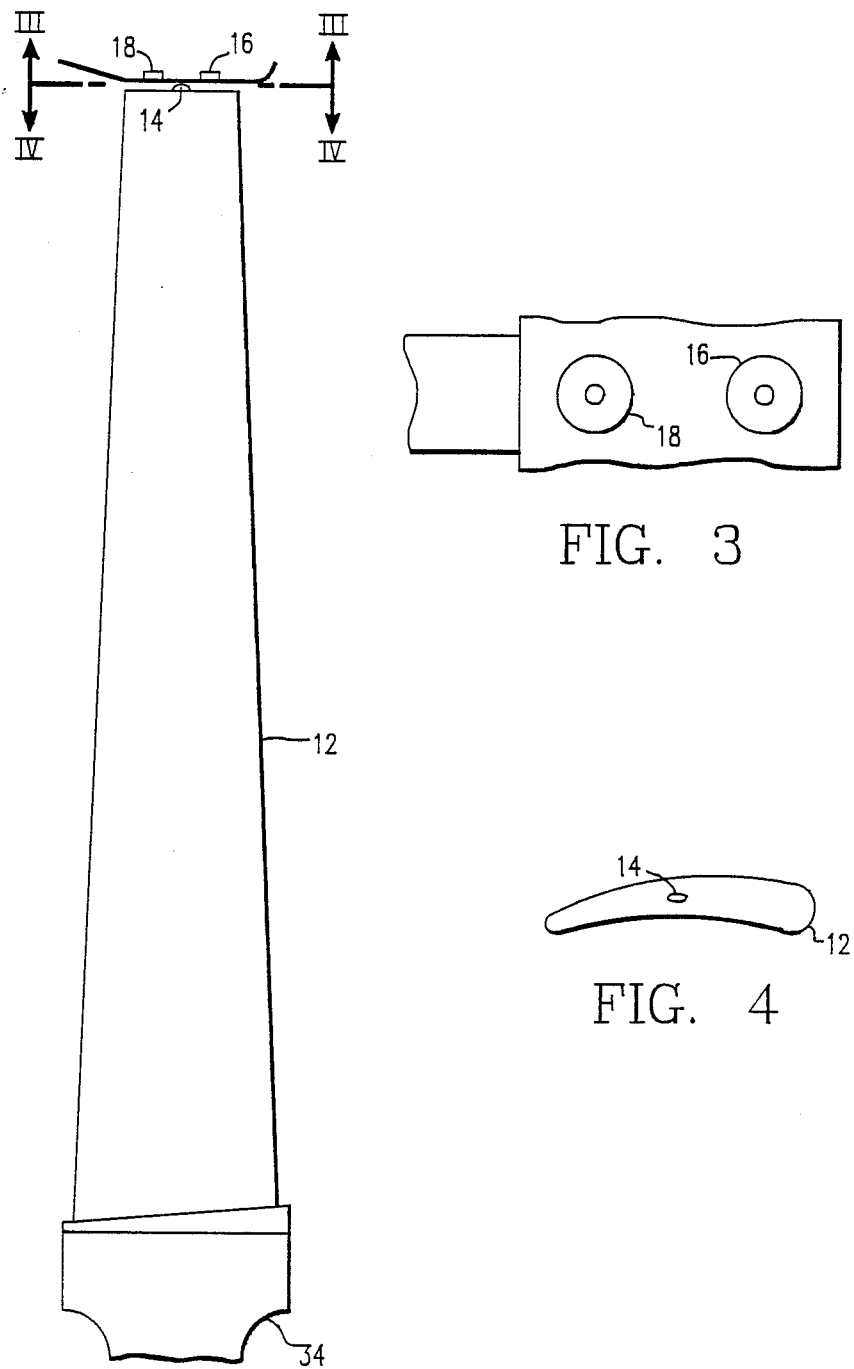
FIG. 2 illustrates the relationship between a protrusion carried by a turbine blade and sensors mounted in the stationary portion of the turbine.
FIGS. 3 and 4 are views taken along the lines III—III and IV—IV, respectively, in FIG. 2.

The relationship between the turbine blade projection 14 and the sensors 16 and 18 is shown in greater detail in FIGS. 2, 3, and 4. The sensors 16 and 18 are mounted in a stationary portion of the steam turbine as shown in FIG. 2. The sensors 16 and 18 are mounted adjacent to one another such that they sense the presence of the same turbine blade at substantially the same time. That mounting relationship is clearly shown in FIG. 3. The end of the turbine blade 12 carrying the projection 14 is shown in FIG. 4.

Figure 5A:
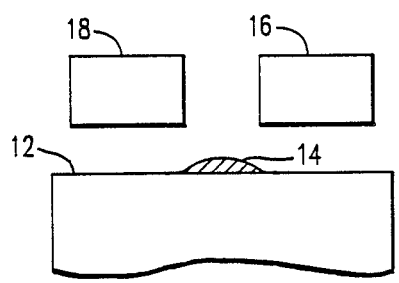
FIGS. 5A, 6A, and 7A illustrate three positions of the turbine blade relative to the sensors.
Figure 5B:
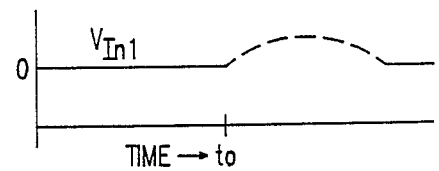
FIGS. 5B, 5C, 6B, 6C, 7B and 7C illustrate the signals output by the sensors in response to the positions of the turbine blade shown in FIGS. 5A, 6A, and 7A, respectively.
Figure 5C:
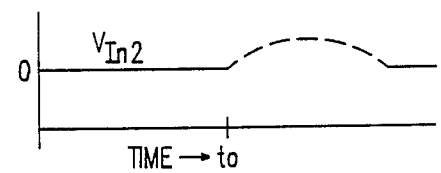

The operation of the present invention to detect axial blade vibration can be understood by referring to FIGS. 5A through 5C, 6A through 6C, and 7A through 7C. In FIG. 5A, the projection 14 carried by the rotor blade 12 is, in the absence of axial vibration, positioned equidistant from the sensors 16 and 18. In that position, the flux patterns produced by the permanent magnets 22 of both sensors are equally effected. Therefore, the analogue signals $V_{In1}$ and $V_{In2}$ are substantially identical as shown in FIGS. 5B and 5C. Thus, in the absence of any axial displacement, a known relationship exists between the signals produced by the first sensor 16 and second sensor 18. That known relationship may be the relationship shown in FIGS. 5B and 5C wherein each of the signals has the same shape and the same peak value occurring at the same time.

As the projection 14 carried by the rotor blade 12 strays because of vibration from the position shown in FIG. 5A, the signal produced by one of the sensors will increase while the signal produced by the other of the sensors correspondingly decreases. That situation is shown in FIGS. 6A through 6C and 7A through 7C.

Figure 6A:
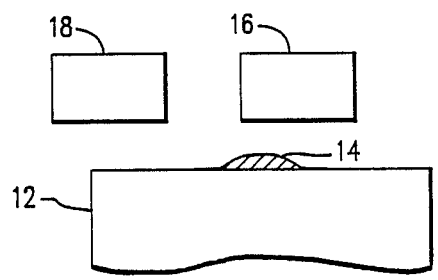
Figure 6B:
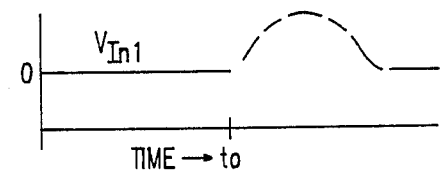
Figure 6C:
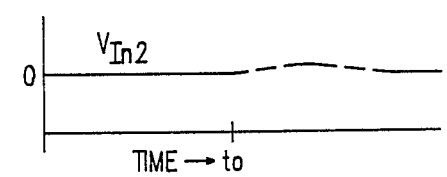
Figure 7A:
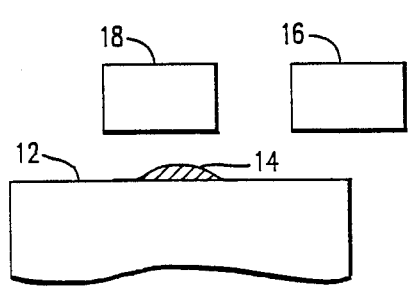
Figure 7B:
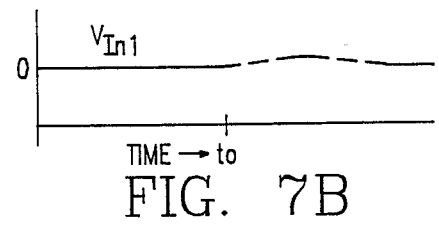
Figure 7C:
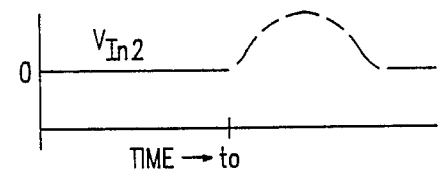

In FIG. 6A the rotor blade 12 is vibrating which results in axial displacement. That axial displacement causes the projection 14 to be positioned more directly under sensor 16. Accordingly, the input signal $V_{In1}$ produced by sensor 16 has a much greater magnitude than the input signal $V_{In2}$ produced by sensor 18 as shown in FIGS. 6B and 6C, respectively. The opposite condition, i.e. axial displacement causing the projection 14 to be located under the sensor 18, is illustrated in FIGS. 7A through 7C. The microprocessor can, by comparing the magnitudes of the input signals $V_{In1}$ and $V_{In2}$, determine the degree of axial displacement. By knowing that the signal $V_{In1}$ equals the signal $V_{In2}$ in the absence of axial displacement; the difference in magnitudes of the two signals is an indication of the degree of displacement; the greater the difference between the magnitudes of the two signals the greater the degree of axial displacement.

As previously discussed, each of the turbine blades within the row of turbine blades is provided with a projection 14. However, one blade within each row of blades will not have the blade projection 14, or may have a blade projection of a different shape. That will produce a different waveform for the input signals $V_{In1}$ and $V_{In2}$ so that that blade can be referred to as an indexing or reference blade. The microprocessor can count the number of input signals from the indexing blade to keep track of which blade is being sensed so that vibration data can be correlated with the appropriate blade. The blade number (i.e. 1, 2 . . . 120) within a row and the vibration data associated with that blade can be stored in the microprocessor 28. It can also be output to a plotter 36, an alarm 38, or other suitable output device, as shown in FIG. 1.

By using the speed sensor 30 the microprocessor 28 can operate the multiplexor 26 to select the input signals $V_{In1}$ and $V_{In2}$ from a particular blade. Thus, the multiplexor can be used to scan all of the input signals $V_{In1}$ and $V_{In2}$ produced by all of the blades or it can be used to select input signals produced by a particular blade.

Figure 8:
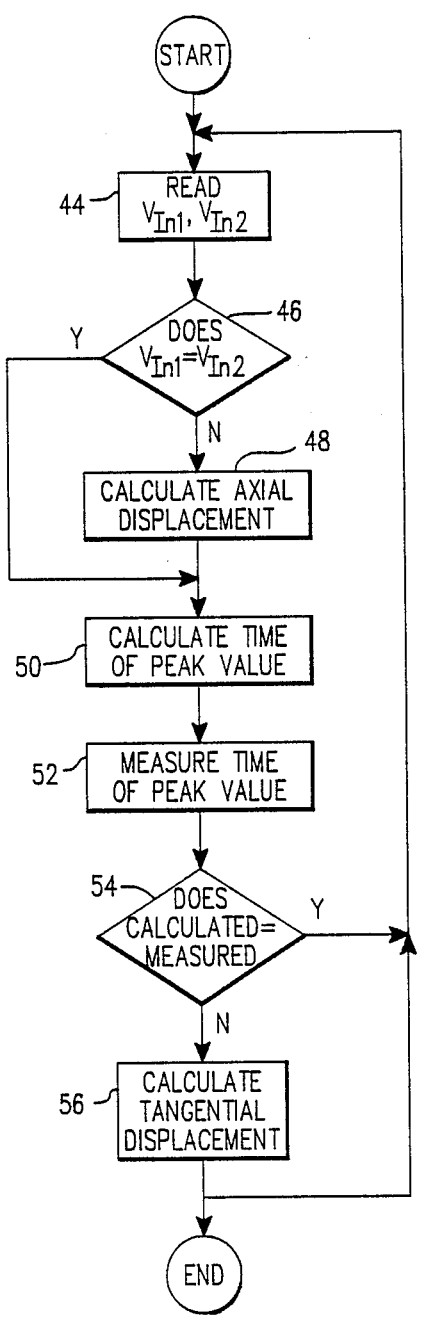
FIG. 8 is a flow chart illustrating appropriate programming for the microprocessor of the present invention.

In addition to detecting axial vibration, tangential vibration, i.e. vibration in the plane of rotation, can also be detected. In FIG. 1 the plane of rotation of the blade 12 is perpendicular to the page. The detection of tangential vibration is explained in conjunction with FIG. 8 which illustrates the programming for the microprocessor 28.

The detection of tangential vibration begins at step 50. However, prior to the detection of tangential vibration, axial vibration may have already been determined as previously described. That is, at step 44 the values of the input signals are read. The two signals are compared at step 46 and if they are equal, the microprocessor proceeds to step 50. If the two signals are not equal, the amount of axial displacement is calculated based on the degree of difference between the two signals. Then the microprocessor proceeds to step 50.

At step 50, the microprocessor 28 uses the speed information and the number of pulses counted before or after the indexing blade to determine the correct time at which the peak value of the input signals $V_{In1}$ and $V_{In2}$ for each blade will occur. The microprocessor measures at step 52 the actual time at which the peak values occur. At step 54 the calculated time at which the peak value occurs is compared to the actual time at which the peak value occurs. If they are the same, there is no tangential displacement and the microprocessor returns to step 44. If they are not the same, the amount of displacement within the plane of rotation of the turbine blades is calculated at step 56; the greater the difference between the two times the greater the degree of tangential displacement. Thereafter, the microprocessor proceeds to step 44.

Additional pairs of sensors 16 and 18 may be provided. The number of sensor pairs and the location of the sensor pairs are dependent upon the turbine's rated speed and the ranges of resonant values of interest. From the chosen locations, a blade's vibration mode can be calculated by the microprocessor 28. Severe or rapid blade displacement changes will be detected and the alarm 38 sounded. To make the inductive effect caused by each blade to be more visible, a damping circuit (not shown) may be placed across each of the sensors to quickly collapse the magnetic field.

In summary, the present invention measures the tangential and axial displacement of the blades of a steam turbine. The invention consists of a number of paired magnetic sensors 16 and 18 mounted in the inner cylinder of the turbine. A small projection 14 is machined in the top of each of the turbine blades. A microprocessor 28 scans the sensors 16 and 18 and measures the induced voltages. As the projection of the blade moves closer or further from a particular sensor, the amount of induced voltage in the pickup coil 22 goes up or down, proportionally. The microprocessor is programmed to translate those voltage changes into an axial displacement. By determining when the projection 14 will be present at sensors 16 and 18, and comparing that result to when the projection 14 is actually present at sensors 16 and 18 the amount of tangential displacement can be determined. The resultant displacements can be stored in the microprocessor 28, plotted, or an alarm sounded if blade resonance or excessive blade displacement is detected.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A system for monitoring the vibration of a plurality of turbine blades configured in a row, comprising:
    first stationary magnetic sensing means for producing a first input signal having a single peak value produced by a blade passing event which deflects the flux pattern produced by said first magnetic sensing means;
    second stationary magnetic sensing means for producing a second input signal having a single peak value produced by a blade passing event which deflects the flux pattern produced by said second magnetic sensing means, said first and second means for sensing being mounted to substantially simultaneously sense the same turbine blade;
    means for comparing the peak values of said first and second signals to detect axial displacement of a turbine blade; and
    output means responsive to said means for comparing.

2. The system of claim 1 wherein the peak value of said first signal equals the peak value of said second signal in the absence of axial displacement.

3. The system of claim 2 wherein the blades include unshrouded turbine blades having projections formed in the tops thereof, and wherein said first and second means for sensing includes magnetic sensors responsive to said projections.

4. The system of claim 2 additionally comprising means or sensing the speed of the turbine blades and means for calculating the time at which the peak values of said first and second input signals occur in response to the sensed speed of the blades.

5. The system of claim 4 additionally comprising means for comparing the calculated time to the actual time when the peak values of said first and second input signals occur to detect blade displacement within a plane of rotation of the turbine blades.

6. A steam turbine having a blade vibration monitoring system, comprising:
    a rotor;
    a plurality of turbine blades carried by said rotor and configured in a plurality of rows;
    first stationary magnetic sensing means for producing a first input signal having a single peak value produced by a blade passing event which deflects the flux pattern produced by said first magnetic sensing means;
    second stationary magnetic sensing means for producing a second input signal having a single peak value produced by a blade passing event which deflects the flux pattern produced by said second magnetic sensing means, said first and second means for sensing being mounted to substantially simultaneously sense the same turbine blade;
    means for comparing the peak values of said first and second input signals to detect axial displacement of a turbine blade; and
    output means responsive to said means for comparing.

7. The steam turbine of claim 6 wherein all but one of the blades in a row have projections formed in the tops thereof which are sensed by said first and second means for sensing.

8. A method of monitoring the vibration of a plurality of turbine blades configured in a row, comprising the steps of:
    substantially simultaneously producing first and second input signals in response to the passing of the same turbine blade past a pair of stationary magnetic sensors thereby deflecting the flux patterns produced by said magnetic sensors, said first and second input signals each having a single peak value representative of the blade passing event, said peak values having a known predetermined relationship in the absence of axial vibration;
    comparing the peak values of said first and second signals to detect axial vibration based on any variance from the known predetermined relationship; and providing an indication of the detected axial vibration.

9. The method of claim 8 wherein the greater the variance from the known predetermined relationship, the greater the amount of axial vibration.

10. The method of claim 8 additionally comprising the steps of calculating the time when the first and second input signals should be produced, measuring the time when the first and second input signals are actually produced, and comparing the calculated time to the measured time to detect tangential blade displacement within a plane of rotation of the turbine blades.

11. The method of claim 10 wherein the greater the differential between the calculated and measured times, the greater the amount of tangential blade displacement.

* * * * *